Oct. 26, 1965 R. H. TEREPIN 3,213,699
POWER TRANSMISSION CHAIN
Filed Dec. 16, 1963 2 Sheets-Sheet 1
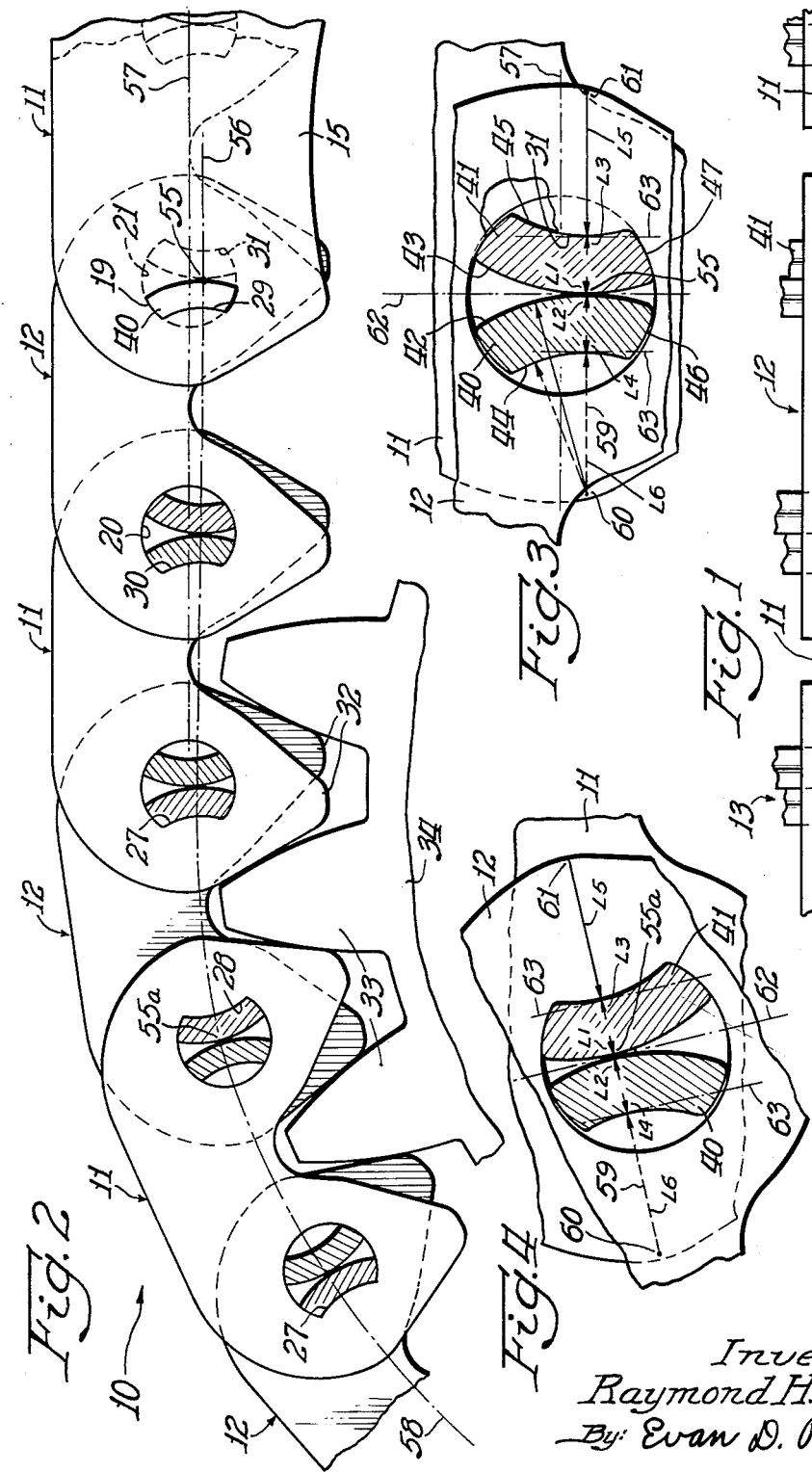
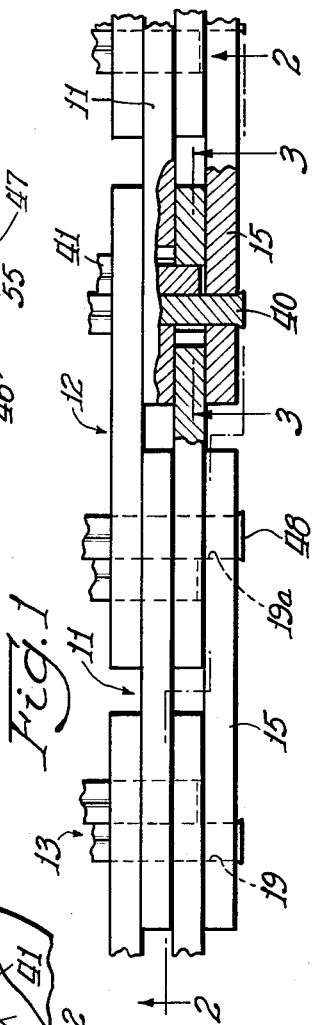
Inventor:
Raymond H. Terepin
By: Evan D. Roberts Atty.

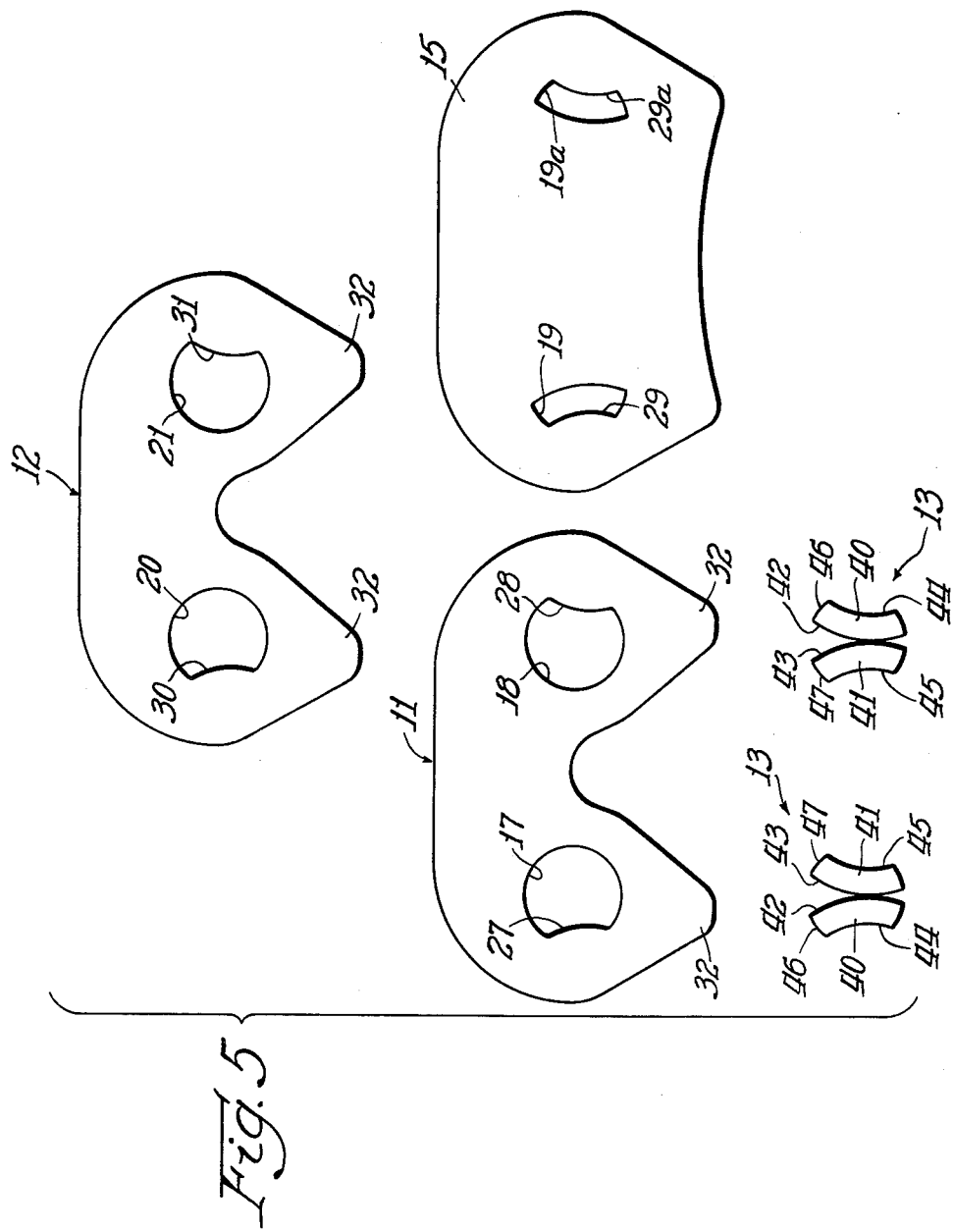

United States Patent Office 3,213,699
Patented Oct. 26, 1965

3,213,699
POWER TRANSMISSION CHAIN
Raymond H. Terepin, Wilmington, Del., assignor to Morse Chain Company, Ithaca, N.Y., a corporation of New York
Filed Dec. 16, 1963, Ser. No. 330,774
9 Claims. (Cl. 74—251)

This invention relates to an improvement in power transmission chains and more particularly to a power transmission chain having an improved connecting pin joint.

It has been found that it is highly desirable to use a link connecting pin made of two parts, one rockable upon the other. As a power transmission chain engages a sprocket, the load is transmitted through the rocking surfaces of the pin parts rather than through rotating or sliding surfaces as is the case in the instance where a solid single part connecting pin is used. However, it was found that as the known types of two-piece rocker connecting pins are articulated in a chain under load and especially in a chain under high speed loads, there are substantial pulsating forces applied tangentially as well as perpendicularly to the rocking surfaces of each pin part. As a result, a couple is induced causing the rocker connecting pin to rotate or at least tend to with respect to the link on which it is seated whereby the pins are caused to fret or otherwise oscillate and vibrate laterally and thereby cause undue wear of the seating or abutting surfaces of the pin parts and the surfaces of the pin apertures in the chain links.

In the past, various attempts have been made to provide means for keying the pin parts to the chain links to positively position the pin parts within the link apertures. However, it was found to be extremely difficult to provide an adequate and yet economical keying arrangement whereby the pin parts would not be urged laterally and would still be appropriately held against oscillational and vibrational forces otherwise resulting in fretting, especially after a small amount of wear has taken place.

It is, therefore, the general object of this invention to provide a two-part rocking type pin for articulately interconnecting power transmission chain links for transmitting load through rocking rather than rotating surfaces and for transmitting the load through the rocking pin parts without producing the substantial tangential forces on the pin parts and link apertures which cause fretting and in turn result in excessive wear on the surfaces of the pin parts and on the link apertures.

The present invention contemplates generally a power transmission chain having overlapping links articularly interconnected by a two-part pin positioned in aligned apertures of the overlaping links whereby one part of the pin is rockable upon the other and the connecting pins and links thereof are capable of transmitting a load through such type of chain without adverse wear on the abutting surfaces of the connecting pins and the link apertures. Each pin part is provided with a rocking surface and a back surface that is substantially concentric with the rocking surface thereof. The links are provided with apertures having pin-supporting surfaces in concentric complementary engagement with the back surface of a respective pin part to support the pin part in rocking engagement with the other pin part of the respective pin.

Other advantages and novel aspects of the invention will become apparent upon the following detailed description, in conjunction with the accompanying drawings wherein:

FIG. 1 is a top view of an inverted tooth chain showing the overlapping relationship of the links and the position of the two-part locking pins.

FIG. 2 is a side view of the inverted tooth chain showing the progressive articulation of the chain as it engages the sprocket.

FIG. 3 is a partial side view of the chain joint in the nonarticulated condition showing transmission of load from one link through the two-part pin and the adjacent connected link along a path perpendicular to the front and back surfaces of the pin parts and the pin supporting surfaces of the respective pin apertures.

FIG. 4 is a partial side view of the chain joint in the articulated position showing the transmission of load from a link through the two-part pin and into the adjacent link.

FIG. 5 is a partial side view of the inverted tooth chain showing the parts thereof in disassembled array.

Referring to the drawings (FIGS. 1–5) an inverted tooth or silent chain is shown for the purpose illustrating the invention and is generally designated by the numeral 10 (FIGS. 1 and 2). The silent chain 10 is of the rocking pin type having the engagement between the chain and sprocket as fully described in numerous patents of which U.S. Patent No. 2,725,755 is one. For purposes of this specification, the elements of the silent chain and cooperating sprocket will be referred to only to the extent that these elements are pertinent to this invention.

The chain 10 (FIGS. 1, 2 and 5) illustrates a preferred embodiment of the invention and broadly comprises sets of spaced aligned links 11 and sets of spaced aligned links 12 alternately positioned and articularly interconnected by two-part pins 13. To position the chain laterally on the sprocket, alternate sets of links (11 in this instance) are flanked by outside guide links 15. If the sprocket is grooved, an inside guide link (not shown) may be used, having a peripheral contour like that of guide link 15, but apertures like links 11 or 12. The links 11 are provided with aligned partial circular fore pin apertures 17 and aligned partial circular rear pin apertures 18.

The guide links 15 (FIGS. 1, 2, and 5) are provided with aligned arcuate fore pin apertures 19 and aligned rear pin apertures 19a (FIG. 1). Similarly, the links 12 are provided with aligned partial circular fore pin apertures 20 and aligned partial circular rear pin apertures 21. The adjacent ends of the alternately positioned links 11 and guide links 15 and the adjacent set of links 12 are interposed (FIG. 1) so that alternate fore apertures 17 and 19, and the rear apertures 21 of adjacent sets of links 11 and 12 are aligned to receive the two-part pin 13 for articulately interconnecting links 11 and 12 as hereinafter fully described.

The links 11 (FIGS. 1, 2, and 5) are provided with arcuate fore and rear pin supporting surfaces 27 and 28 respectively (FIG. 5) adjacent outer opposed segments of the fore and rear pin apertures 17 and 18 respectively. The arcuate apertures 19 and 19a of the guide links 15 are likewise provided with arcuate fore and rear pin supporting surfaces 29 and 29a respectively. Similarly, the links 12 are provided with arcuate fore and rear pin supporting surfaces 30 and 31 adjacent outer opposed segments of the fore and rear apertures 20 and 21 respectively. A pair of teeth 32 are provided on each of the links 11 and 12 and are adapted to engage with teeth 33 of a chain sprocket 34.

The two-part connecting pins 13 (FIGS. 1, 2, and 5) comprise a long securing pin part 40 and a short included pin part 41. The long part 40 is provided with an arcuate cylindrical rocking surface 42 in rocking engagement with an arcuate surface 43 of the short pin part 41 (FIGS. 2, 3, and 4). The pin parts 40 and 41 are provided with arcuate back surfaces 44 and 45, respectively, that are respectively concentric with the rocking surfaces of the pin parts 40 and 41. It should be noted that the rocking, back, and supporting surfaces 42–43, 44–45, and 27–31, respectively, of this invention may be merely arcuate and are not necessarily limited to a circular, cylindrical, and concentric configuration. However, circular, cylindrical, and concentric surfaces provide the fullest realization of the feature of the invention as will hereinafter be described.

Pin parts 40 and 41 (FIG. 5) are each further provided with a pair of partial circular surfaces 46 and 47, respectively, between the rocking and back surfaces 42, 44 and 43, 45 thereof. Each pair of said surfaces 46 and 47 has a common radius that is substantially equal to the radius of the apertures 17, 18 and 20, 21 of the links 11 and 12. The long pin part 40 and the short pin part 41 of each pin 13 is positioned in each of the aligned interposed apertures 17, 21 and 18, 20 of the guide and connecting links 11 and 12 (FIGS. 1–4) for articularly interconnecting links.

The long pin part 40 (FIGS. 1 and 2) has ends 48 that extend beyond the common aligned interposed apertures of the links 11 and 12 and through the arcuate apertures 19 and 19a in the guide links 15 (FIGS. 1 and 5). The long pin part 40 is upset on the ends 48 thereof (FIG. 1) for retaining the pin part 40 in position to secure the chain 10 in the assembled condition (FIG. 1). The short included pin part 41 is similarly positioned in each of the respective aligned apertures 17, 21 and 18, 20 of the plates 11 and 12 and terminates adjacent the inner face of the flanking guide links 15 (FIG. 1).

The long pin back surface 44 (FIGS. 2 and 5) of the long pin part 40 of each pin 13 is complementarily supported by the supporting surfaces 27 or 28 and 29 or 29a of the links 11 and the guide links 15. Similarly, the small pin back surface 45 of the short pin part 41 of each pin 13 is complementarily supported by the supporting surfaces 30 or 31 of the links 12 respectively. The circular edge surfaces 46 of the long pin parts 40 position the pin part 40 by complementary engagement with the link aperture surfaces 17 and 18 of the links 11 and aperture surfaces 19 and 19a of the guide links 15. Similarly, the circular edge surfaces 47 of the short pin parts 41 position the pin part 41 by complementary engagement with the link aperture surfaces 20 and 21, of the links 12. The thickness of the long pin parts 40 is such, that when the pin parts are abutted against their supporting surfaces 27 or 28 in links 11, the outer convex rocking surfaces 42 (FIGURES 3 and 5) of the pin parts 40 do not extend quite as far as the vertical center lines of the arcuate portions 17 and 18 of the link apertures. Similarly, the thickness of the short pin parts 41 is such that the outer convex rocking surfaces 43 (FIGURES 3 and 5) of the pin parts 41 do not extend as far as the vertical center lines of the arcuate portions 20 and 21 of the link apertures when the concave surfaces 45 of the pin parts are in engagement with the supporting surfaces 30 and 31 of links 12. It is noteworthy that this feature provides clearance between the long pin part surfaces 46 and aperture surfaces 20 and 21 of links 12, and between the short pin part surfaces 47 and the aperture surfaces 17 and 18 of links 11 when a tension is applied to the straight chain bringing the rocking surfaces 42 and 43 of the pins to contact with each other. This clearance allows the rocker faces 42 and 43 to roll on each other when the chain joints are articulated without causing interference between pin part surfaces 46 and 47 and link aperture surfaces 20–21 and 17–18 of links 12 and 11 respectively.

The chain 10 is thus provided with pin supporting surfaces 27–31 that are alternately positioned for supporting the respective pin parts 40 and 41 of each pin 13 in a given position within the aligned apertures 17–21 and in respective rocking engagement with each other along a line contact projected at point 55 (FIGS. 2–4). When the chain is moving linearly (FIG. 3) the pin parts line contact 55 moves along a linear line 56 shown in FIG. 3 below the line 57 through the centers of the apertures 17–21.

As the chain links 11 and 12 are articulated and wrapped on the sprocket 34 (FIG. 2) the line contact projected at point 55 gradually moves upwardly and outwardly along the rocking surfaces 42 and 43 generally toward a line contact projected at point 55a which may or may not be in a wrapped pitch line 57 (FIGS. 2 and 4). The chain 10 provided by this invention thereby provides a chain having a rocker type pin joint for transmitting load. It should be noted that the contact line 56 will move generally outward during articulation but whether it is ultimately below, coincident with, or above and beyond line 57 has no specific limiting bearing on the subject invention.

The novelty of the chain herein described resides in the unique pin 13 and the cooperating link structures that cause the chain load to be transmitted through the chain 10 in a manner heretofore impossible and as is hereinafter described. The resulting chain joint can be made to be substantially void of the lateral forces that result in pin fretting or other adverse movements that otherwise result in excessive wear on the pins and aperture surfaces of known types of rocker type, inverted tooth, silent chains by employing the structure and principals of this invention to the fullest.

In particular, the affective scope of the novel structures that provide the heretofore impossible mode of transmitting load between the pin parts of inverted tooth chains are structually illustrated in detail in FIGS. 3, 4, and 6. As previously indicated, the rocking, back, and supporting surfaces 42–43, 44–45, and 27–31 of this invention are not limited to an absolutely circular, cylindrical, and concentric configuration and need only be generally arcuate surfaces having approximately common centers to provide the basic novel features of this invention. Alternative embodiments could have various combinations of absolutely circular, cylindrical, and concentric surfaces and surfaces that are merely arcuate without the circular, cylindrical, and perfectly concentric characteristics. However, inasmuch as circular, cylindrical, and concentric surfaces for the rocking, back, and supporting surfaces 42–43, 44–45, and 27–31, respectively, provide the fullest realization of the optimum benefits of the features of the invention, the operation of the invention will be described with reference to an embodiment thereof that is provided with circular, cylindrical, and concentric rocking, back, and supporting surfaces; and the less than optimum structure will be subsequently briefly described.

The load that is transmitted between adjacent links 11 and 12 and the corresponding interconnecting pin parts 40 and 41 is confined to a load plane 59 (FIGS. 3 and 4). Inasmuch as the rocking, back, and supporting surfaces 42, 44 and 27, 28, 29–29a, respectively, and 43, 45 and 39–31, respectively, associated with the long and short pin parts 40 and 41, respectively, are concentric for each pin part, the load plane 59 passing through the line of rocker contact projected at 55 is confined to a single continuous plane void of tangential components, between the pin parts 40 and 41, across supporting surfaces 27–31 of the links 13 and through the centers 60 and 61 of the left and right adjacent pin parts 40 and 41 (FIG. 3).

The load thus transmitted through the load plane 59 (FIG. 3) passes coincident with the linear pitch line 56 and perpendicular to a tangent 62 which is common to the rocking surfaces 42 and 43 of mating pin parts 40 and 41. This load is schematically represented by an arrow L1 in the right pin part 40 or 41 (FIGS. 3 and 4) and is resisted by an equal and opposite load schematically represented by an arrow L2 in the mating left pin part 41 or 40. The loads L1 and L2 are transmitted through the load plane 59 to the appropriate surfaces of the supporting surfaces 27–31 (FIG. 3) of the plates 11 and 12 in the load plane 59 as illustrated by arrows L3 and L4, respectively. Inasmuch as forces L3 and L4 are perpendicular to the arcuate supporting surfaces in the situation where the front and back surfaces of the pin parts 40 and 41 are concentric, the forces L3 and L4 have substantially no tangential components inducing a couple and there is no tendency for rotation or movement of the connecting pin parts 40, 41 with respect to their supporting surfaces 27–31 in the link apertures 20 and 21.

Inasmuch as the circular cylindrical supporting surfaces 27–31 and the respective back surfaces 44 and 45 of the pin parts 40 and 41 are complementarily concentric with the rocking surfaces 42 and 43, the forces L3 and L4 are likewise absorbed by forces L5 and L6 in the respective supporting surfaces of surfaces 27–31 of the link plates within the load plane 59 and perpendicular to a common support tangent 63, all of the load must pass through the only contact point 55. The load is, therefore, transmitted perpendicularly to the respective common tangents 62 and 63, between the respective engaging surfaces. The transmission of the load, therefore, does not result in collateral forces in a direction perpendicular to the plane 59 of the load forces L.

As the chain is wrapped on the sprocket 34, the pin parts 40 and 41 gradually roll on each other so that the line of contact 55 is gradually moved outwardly along the mated rocking surfaces 42 and 43 to the position 55a (FIGS. 2–4). The load force plane 59 likewise gradually shifts radially outward along a tangent to the sprocket 34 so as to always pass through the point of contact 55–55a and substantially perpendicular to the common tangents 62 and 63 between the mated rocking surfaces 42 and 43 and the appropriate support and back surface of the surfaces 27–31 and 44–45, respectively, of each pin part 40 and 41.

Inasmuch as the illustrated respective rocking, back, and supporting surfaces 42–43, 44–45, and 27–31 are concentric, the load transmitted therethrough through the sole line of contact 55–55a will be transmitted along a radius of the concentric surfaces, in a load force plane 59 and perpendicularly to the tangents 62 and 63, the resultant load forces L1, L2, L3, L4, L5, L6 are void of any incidental lateral components. Consequently, the pin parts 40 and 41 are not subjected to lateral or perpendicular forces resulting in fretting of the pin parts 40 and 41 during wrapping as well as during linear movement of the chain 10.

Expressed generally, the load is transmitted between the pin parts 40 and 41 through the line contact plane 59 which is radially positioned with respect to the concentric surfaces of both mating pin parts and respective supporting surfaces. The load is thus substantially represented solely by aligned supporting forces L1–L4 in the load force plane 59 due to the respective concentricity of the rocking, back, and supporting surfaces of surfaces 42–43, 44–45, and 27–31.

As previously pointed out, other embodiments of the invention may utilize various combinations of rocking, back, and supporting surfaces 42–43, 44–45, and 27–23 that are not necessarily circular and perfectly concentric. In these instances, the load force plane 59 may not be exactly perpendicular to the tangents 62 and 63 with the result that the load forces L1–L6 will have small tangential or lateral components. However, the resultant load forces L1–L6 of these other embodiments will be transmitted in load force planes that are approximately perpendicular to the tangents 62 and 63. Consequently, although the pin parts 40 and 41 in these instances will be subjected to some small lateral forces, the use of noncircular and nonconcentric structures may, nevertheless, utilize the basic features of the invention to greatly reduce the lateral components of the load forces transmitted between the arcuate surfaces of the pin parts and the links.

It is to be understood that the invention is not to be limited to the specific constructions and arrangements shown and described, except only insofar as the claims may be so limited, as it will be understood to those skilled in the art that changes may be made without departing from the principles of the invention.

What is claimed is:

1. A power transmission chain of the type adapted to cooperatively engage the teeth of a sprocket comprising a series of overlapping sets of links having common aligned pin apertures formed therethrough, pivot pins positioned in said pin apertures for interconnecting said links to form a chain, said pins including two pin parts, each of said pin parts having a rocking surface in rocking engagement with said rocking surface of said other pin part of said pin and a back surface of the same configuration as said rocking surface, and a support surface formed on each link adjacent the apertures thereof and defining a portion of each of the apertures in respective complementary engagement with said back surface of one of said pin parts of each of said pins positioned in the respective aperture for supporting said pin part in the respective aperture.

2. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two pin parts, each of said pin parts having arcuate rocking surfaces in rocking engagement with said rocking surface of said other pin part of said pin, each of said pin parts having an arcuate back surface, and support surfaces formed on each of said links adjacent the apertures thereof and defining a portion of each of the apertures in complementary engagement with said back surface of said pin parts of each of said pins positioned in the respective aperture for supporting said pin parts in the apertures.

3. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two pin parts, each of said pin parts having arcuate rocking surfaces in rocking engagement with said rocking surface of said other pin part of said pin, each of said pin parts having a back surface substantially concentric with said rocking surface of said pin part, and support surfaces formed on each of said links adjacent the apertures thereof and defining a portion of each of the apertures in respective complementary engagement with said back surface of one of said pin parts of each of said pins positioned in the respective aperture for supporting said pin parts in the apertures.

4. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two pin parts, each of said pin parts having cylindrical rocking surfaces in rocking engagement with said rocking surfaces of said other pin part of said pin, each of said pin parts having a back surface substantially concentric with said rocking surface of said pin parts, and support surfaces formed on each of said links adjacent the apertures and defining a portion of each of the apertures in respective complementary engagement with said back surface of the respective pin part of each of said pins positioned in the respective aperture for supporting said pin parts in the apertures.

5. A power transmission chain of the type adapted to cooperatively engage the teeth of a sprocket comprising a series of overlapping sets of links having common aligned pin apertures formed therethrough, pivot pins positioned in said pin apertures for interconnecting said links to form a chain, said pins including two pin parts, each of said pin parts having a circular cylindrical rocking surface in rocking engagement with said rocking surface of said other pin part of said pin, each of said pin parts having a back surface concentric with said rocking surface of said pin part, each of said pin parts having edge surfaces between said rocking and said back surfaces in complementary engagement with alternate links within the aligned apertures, and a support surface formed on each link adjacent the apertures thereof and defining a portion of each of the apertures in respective complementary engagement with said back surface of one of said pin parts of each of said pins positioned in the respective aperture for supporting said pin part in the apertures.

6. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two pin parts, each of said pin parts having respectively concentric front cylindrical rocking surfaces and back cylindrical supported surfaces, and support surfaces formed on each of said links adjacent the apertures thereof in respective complementary engagement with said back surface of one of said pin parts of each of said pins positioned in the respective apertures and defining a portion of each of the apertures for supporting said pin parts with the respective rocking surfaces thereof in rocking engagement.

7. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two pin parts, each of said pin parts having a circular cylindrical rocking surface in rocking engagement with said rocking surface of said other pin part of said pin, each of said pin parts having a back surface concentric with said rocking surface of said pin part, and support surfaces formed to each of said links adjacent the apertures thereof and defining a portion of each of the apertures in respective complementary engagement with said back surface of each of said pins positioned in the respective apertures for supporting said pin parts in the apertures.

8. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two parts, each of said pin parts having a circular cylindrical rocking surface in rocking engagement with said rocking surface of said other pin part of said pin, each of said pin parts having a back surface concentric with said rocking surface of said pin part, each of said pin parts having edge surfaces between said rocking and said back surfaces in complementary engagement with the links within the aligned apertures, and support surfaces formed on each of said links adjacent the apertures thereof and defining a portion of each of the apertures in respective complementary engagement with said back surface of one of said pin parts of each of said pins positioned in the respective aperture for supporting said pin parts in the apertures.

9. A power transmission chain of the type adapted to cooperatively engage the teeth of a sprocket comprising a series of overlapping sets of links having common aligned pin apertures formed therethrough, pins positioned in the pin apertures for articulately interconnecting said links to form a chain, said pins including two parts, each of said pin parts having a circular cylindrical rocking surface in rocking engagement with said rocking surface of said other pin part of said pin, each of said pin parts having a circular cylindrical back surface substantially concentric with said rocking surface of said pin part, each of said pin parts having edge surfaces between said rocking and said back surfaces in complementary engagement with the links within the alignment apertures, and a circular cylindrical support surface formed on each plate adjacent each aperture thereof and defining a portion of each of the apertures in respective complementary engagement with said back surface of one of said pin parts of each of said pins positioned in the respective aperture for supporting the respective pin part in the aperture.

References Cited by the Examiner
UNITED STATES PATENTS

| | | |
|---|---|---|
| 844,805 | 2/07 | Howe. |
| 1,488,710 | 4/24 | Ramsey. |
| 1,644,656 | 10/27 | Belcher. |
| 1,661,074 | 2/28 | Johnston et al. |
| 1,743,500 | 1/30 | Sturtevant. |
| 2,653,485 | 9/53 | MacArthur. |

DON A. WAITE, *Primary Examiner.*

Dedication 3,213,699.—*Raymond H. Terepin*, Wilmington, Del. POWER TRANSMISSION CHAIN. Patent dated Oct. 26, 1965. Dedication filed Mar. 11, 1970, by the assignee, *Borg-Warner Corporation*.

Hereby dedicates to the People of the United States the entire remaining term of said patent.

[*Official Gazette April 14, 1970.*]